United States Patent [19]
Zimmer et al.

[11] Patent Number: 6,090,880
[45] Date of Patent: Jul. 18, 2000

[54] RUBBER COMPOSITION AND TIRE HAVING TREAD THEREOF

[75] Inventors: René Jean Zimmer, Howald; Friedrich Visel, Bofferdange, both of Luxembourg; Uwe Ernst Frank, Marpingen, Germany; Thierry Florent Edmé Materne, Attert, Belgium; Pierre Marie Jean Dauvister, Mersch, Luxembourg

[73] Assignee: The Goodyear Tire & Rubber Company, Akron, Ohio

[21] Appl. No.: 08/910,752

[22] Filed: Aug. 13, 1997

Related U.S. Application Data

[60] Provisional application No. 60/030,385, Sep. 13, 1996.

[51] Int. Cl.$^7$ .......................................................... C08K 3/00
[52] U.S. Cl. .......................... 524/492; 524/493; 524/495; 524/496
[58] Field of Search ..................................... 524/492, 493, 524/495, 496

[56] References Cited

U.S. PATENT DOCUMENTS

| | | | |
|---|---|---|---|
| 5,064,910 | 11/1991 | Hattori et al. | 525/359.1 |
| 5,248,722 | 9/1993 | Detrano et al. | 524/496 |
| 5,514,756 | 5/1996 | Hsu et al. | 525/332.5 |
| 5,569,697 | 10/1996 | Ferrandino et al. | 524/492 |

FOREIGN PATENT DOCUMENTS

| | | | |
|---|---|---|---|
| 711805A1 | 5/1996 | European Pat. Off. | C08K 9/02 |

*Primary Examiner*—Edward J. Cain
*Attorney, Agent, or Firm*—Henry C Young, Jr.

[57] ABSTRACT

A rubber composition comprised of elastomer(s) including a tin or silicon modified elastomer, modified carbon black and silica coupler. Said modified carbon black has one or more of silanol, siloxane, titanium dioxide, zirconium hydroxide and aluminum hydroxide on its surface. A tire having a tread of such rubber composition is also provided.

69 Claims, No Drawings

RUBBER COMPOSITION AND TIRE HAVING TREAD THEREOF

This application claims the benefit of U.S. provisional application Ser. No. 06/030,385 filed Sep. 13, 1996.

FIELD

This invention relates to a rubber composition composed of a modified copolymer of conjugated diene with styrene or alpha-methylstyrene together with a modified carbon black reinforcement and particularly to a tire having a tread of such rubber composition.

BACKGROUND

Tires are typically prepared of treads of elastomer based rubber compositions which are conventionally carbon black reinforced. Sometimes tire tread rubber compositions are also silica reinforced.

In circumstances where tire treads contain appreciable amounts of silica reinforcement, a silica coupler is used to couple the silica to the elastomer in order to enhance its rubber reinforcing effect.

Carbon black reinforced rubber compositions for use in tire treads have been suggested in which classical carbon blacks are used in combination with a silica coupling. For example, see U.S. Pat. No. 4,820,751.

It is desired herein to provide a novel rubber composition for tire treads which utilize a carbon black having a modified surface in order to more effectively reinforce rubber compositions intended for use as a tire tread component particularly when used with a silica coupling agent.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which is comprised of (A) 100 parts by weight of at least one diene-based elastomer composed of (i) about 20 to 100, alternatively about 50 to about 80, phr of at least one modified copolymer elastomer of styrene or alpha-methylstyrene and conjugated diene selected from at least one of butadiene and isoprene, said modified elastomer being a coupled or capped elastomer with tin or silicon and (ii) zero to about 80, alternatively about 20 to about 50, phr of at least one elastomer selected from homopolymers of conjugated dienes, copolymers of conjugated dienes and copolymers of at least one conjugated diene with an aromatic hydrocarbon selected from styrene and alpha-methylstyrene, (B) about 30 to about 110, alternatively about 30 to about 90, phr of reinforcing filler composed of (i) about 30 to about 110, alternatively about 30 to about 90, phr of modified reinforcing carbon black, said modified carbon black containing at least one moiety selected from silanol, siloxane, titanium oxide, titanium hydroxide, zirconium oxide, zirconium hydroxide and aluminum hydroxide groups on the surface thereof, and (ii) zero to about 30, alternatively, about 10 to about 20, phr of at least one of precipitated silica containing silanol groups on the surface thereof and unmodified reinforcing carbon black, (C) at least one silica coupler having a moiety, preferably a silane moiety, reactive with (i) at least one of said moieties on the surface of said modified carbon black, and (ii) with silanol groups on said silica, if silica is used, and another moiety interactive with at least one of said elastomer(s).

Preferably, the said conjugated diene is selected from at least one of butadiene and isoprene.

In one aspect of this invention, a tire having a circumferential tread of said rubber composition is provided.

An important feature of this invention is a rubber composition prepared of three significant components, namely, the modified diene-based elastomer with tin or silicon, the modified carbon black and a silica coupling agent.

Preferably, the modified carbon black is a surface-modified carbon black having been modified to obtain one or more of said moieties on the carbon black surface.

Significantly, a silica coupler is used having a moiety, preferably having a silane moiety, which is capable of reacting with at least one of said moieties on the surface of said modified carbon black and, also with silanol groups on a precipitated silica, if used.

Significantly, and although the mechanism may not be fully understood, the tin or silicon, preferably tin, of the modified diene-based elastomer, upon mixing the aforesaid modified elastomer, modified carbon black and silica coupler together under typical conditions of elevated temperature and relatively high shear, may become available to interact with one or more of the aforesaid moieties on the surface of said treated carbon black as well as the said silica coupling agent, thereby creating very complex reactions.

Modified carbon blacks may be prepared by various means to provide the aforesaid moieties on their surfaces.

For example, the carbon black may be treated by sodium silicate solution forming a silicate structure as described in EP-A1-711 805.

Alternatively, and in a more preferred practice, a carbon black may be treated with at least one alkoxy compound having the formula: $R_{4-n}M(OR')_n$, wherein R is a saturated alkyl radical selected from methyl, ethyl, propyl, and butyl radicals; R' is a saturated alkyl radical containing from 1 to 18, preferably from 1 to 4, carbon atoms; and M is selected from silicon, titanium, zirconium and aluminum and wherein n is an integer from 1 to and including 4, or from 1 to and including 3 in the case that M is aluminum.

Preferably, R' is a radical selected from at least one of methyl, ethyl, n-butyl, isobutyl, n-propyl, hexadecyl and octadecyl radicals.

Preferably, R and R' are individually selected from methyl, ethyl and propyl radicals. Preferably R' is an ethyl radical.

Preferred alkoxy compounds are tetraalkoxysilicates such as tetraethyoxysilicate, tetraethoxy titanate, tetraethoxy zirconate and triethoxy aluminate.

In one aspect of this invention, it may be desired to modify less than 100 percent of the surface of the carbon black, namely, about 20 to about 90 percent of the surface of the carbon black. However, in some respects, it may be desirable to modify only about 20 to about 75 percent of the surface of the carbon black if is desired that a greater amount of the surface of the carbon black is untreated. For example, is it considered herein that if reduced electrical resistance, or increased electrical conductivity, of the rubber composition containing the treated carbon black is a desirable feature, then it may be desired to treat the aforesaid lesser portion of the carbon black surface, thereby leaving a greater portion of the carbon black surface available to reduce the rubber composition's electrical resistance.

It is contemplated that, in the practice of this invention, said modified carbon black contains about 0.5 to about 20, alternatively about 0.5 to about 10, weight percent of silicon, titanium, zirconium and/or aluminum on the surface thereof as determined by ashing the modified carbon black. By the term "ashing the modified carbon black" it is meant that "it is pyrolyzed under an oxidative atmosphere" as it is believed to be well known to those having skill in such art.

It is further contemplated that the surface of the modified carbon black, when modified by a silicon based compound such as an alkoxysilane or organoalkoxy silane, for example, usually contains both silanol and siloxane groups on its surface such as, for example, about 0.1 to about 8 silanol groups per $nm^2$ of the surface of the carbon black.

Reinforcing carbon blacks and carbon blacks for preparation of modified carbon blacks contemplated for use in this invention are carbon blacks typically suitable for reinforcing elastomers such as, for example, carbon blacks having an Iodine adsorption value in a range of about 40 to about 160 g/kg, a DBP (dibutylphthalate) Number in a range of about 80 to about 180 $cm^3/100$ g and the nitrogen absorption number (BET) in the range of about 50 to about 200 $m^2/g$. Reference may be made to *The Vanderbilt Rubber Handbook* (1990) pages 416–418 for general descriptions of such carbon blacks. Representative of such carbon blacks are, for example, N110, N121, N234, N330, N660 and the like.

The said surface-modified carbon black might also be characterized, for example, by having a nitrogen absorption value (BET) in a range of about 50 to about 200 $m^2/g$, a dibutylphthlate (DBP) value in a range of about 50 to about 300 cc/100 gm. It may also have a CTAB value in a range of about 50 to about 250 $m^2/g$.

Its mercury porosimetry characteristics are reported herein as being a mercury specific surface area (HgSSA) of about 30 to about 300 $m^2/g$, an overall mercury porosity, V(Hg), of greater than 1.0 $cm^3/g$. A reference for HgSSA and mercury porosity determination may be found in "Adsorption, Surface Area and Porosity" by S. J. Gregg and K. S. Sing, Academic Press, London/New York, II Edition.

In practice, the carbon black may be modified, for example, by treating the carbon black with at least one of said alkoxy or organoalkoxy silane, titanium, zirconium or aluminum compounds at a temperature in a range of about 25 to about 800° C. in an inert gaseous atmosphere (e.g. nitrogen atmosphere) for a period of about 10 to about 150 minutes. The degree of modification of the carbon black surface might be controlled by the ratio of the alkoxy or organoalkoxy compounds to the carbon black. For an example of determining the degree of carbon black surface modification, analytical methods involving FTIR spectroscopy, 29Si NMR spectroscopy, SIMS mass spectrometry and BET method (nitrogen adsorption) can be used.

For example, the silanol (Si-OH) and siloxane groups on the surface of the carbon black might be characterized, or determined, by FTIR (Fourier Transform Infrared Spectroscopy) analysis, by 29Si NMR solid state spectroscopy and SIMS (Secondary Ionization Mass Spectroscopy) with the FTIR band for the siloxanes at about 1150 $cm^{-1}$ and the silanols at about 3250 $cm^{-1}$.

Preferably the carbon black to be treated typically has an Iodine adsorption value in a range of about 40 to about 160 g/kg, a DBP number in a range of about 80 to about 180 cc/100 gm and a nitrogen absorption number (BET) in a range of about 50 to about 200 $m^2/g$. Representative of such carbon blacks are those such as, for example, N110, N121, N234, N330 and N660 carbon blacks. Examples of such carbon blacks can be readily found, for example, in *The Vanderbilt Rubber Handbook,* edition 1978, pages 411 ff.

An important feature of this invention is the use of the modified carbon black with a modified organic solution polymerization prepared copolymer elastomer of, for example, styrene and a diene selected from butadiene and isoprene and the living polymer, before terminating the polymerization, modified with tin or silicon.

Such modified copolymer rubbers, or elastomers, may be, for example, styrene/butadiene copolymers and styrene/isoprene/butadiene terpolymers. It is contemplated herein that the tin modified copolymer elastomer is considerably more desired than the silicon modified copolymer.

An important characterization of the elastomers, and particularly the tin modified elastomers, is that a major portion, preferably at least about 50 percent, and more generally in a range of about 60 to about 85 percent of the Sn bonds (or Si bonds) in the elastomer are bonded to diene units of the styrene/diene copolymer, which might be referred to herein as Sn-dienyl bonds (or Si-dienyl bonds), such as, for example, butadienyl bonds in the case of butadiene being terminus with the tin (or silicon).

In the preparation of the elastomer during the polymerization of the monomers, it is to be appreciated that the polymerization reactivity of the butadiene monomer is considerably greater than the styrene monomer. Therefore, the living copolymer, before termination with the tin compound, typically has styryl units available to react with the tin compound, yielding a terminal tin-styryl bond whereas it is a tin-dienyl bond which is more desirable as is believed to be well known to those in the rubber composition preparation art. Creation of tin-dienyl bonds can be accomplished in a number of ways such as, for example, sequential addition of butadiene to the copolymerization system or use of modifiers to alter the styrene and/or butadiene and/or isoprene reactivity ratios for the copolymerization. It is believed that such techniques, whether used with a batch or continuous copolymerization system, is well known to those having skill in such art.

The modification of the elastomer, such as tin coupling or tin capping, can be accomplished by relatively conventional means and is believed to be well known to those skilled in such art.

For example, a copolymer elastomer can be prepared by copolymerization of styrene with 1,3-butadiene and/or isoprene in an organic solution with an alkyl lithium catalyst. A co-catalyst or catalyst modifier may also be used. Such polymerization methods are well known to those skilled in such art. After formation of the copolymer elastomer, but while the catalyst is still active and, therefore, while the copolymer is still considered a live copolymer capable of further polymerization, the polymerization can be terminated with reacting the live copolymer with a tin compound (or silicon compound). Various tin compounds (or silicon compounds) can be used and tin tetrachloride is usually preferred. This, taking into account that the valence of tin is four, typically the modified copolymer is considered as being coupled, with an accompanying molecular weight jump, or increase, with the modified copolymer being in what is sometimes referred to as a star shaped, or configured, coupled elastomer. On the other hand, if an trialkyl tin (or silicon) compound is used, then only a single halogen is available and the modified copolymer is a capped copolymer. Such preparation of coupled and capped copolymers prepared by organolithium catalysis is believed to be well known to those having skill in such art. It is to be appreciated that the modified copolymer may be a mixture of coupled and capped copolymer.

Examples of tin modified, or coupled, styrene/butadiene might be found in, for example, U.S. Pat. No. 5,064,910.

In practice, the coupled, or capped as the case may be, styrene/diene copolymer elastomer typically has a styrene content in a range of about 10 to about 40 percent, and may be further characterized by having a glass transition temperature within the range from −85 to 0° C. A coupled styrene/isoprene/butadiene copolymer may have a similar styrene content and properties except that its isoprene content is typically in a range of about 1 to about 20 percent.

The tin coupled copolymer elastomer can also be tin coupled with an organo tin compound such as, for example, alkyl tin trichloride, dialkyl tin dichloride and trialkyl tin monochloride, yielding variants of a tin coupled copolymer with the trialkyl tin monochloride yielding simply a tin terminated copolymer.

Accordingly, a modified styrene/conjugated diene copolymer, particularly where the diene is selected from at least one of 1,3-butadiene and isoprene, is the product of modification of a reactive styrene/conjugated diene copolymer prepared by polymerization with an organolithium catalyst by reacting with at least one compound having the formula: $R''_{4-n}M'X_n$, wherein n is an integer from 1 to and including 4, X is a halogen radical selected from chlorine, iodine and bromine radicals, preferably chlorine radicals; R" is a saturated alkyl radical selected from methyl, ethyl, propyl and butyl radicals; and M' is selected from tin and silicon.

In practice, and although the mechanism may not be well understood, it appears that, upon mixing the coupled elastomer with compounding ingredients to prepare a rubber composition, the bonds of the elastomer of the tin may break somewhat, leaving the tin molecule available to react, or otherwise interact, with other moieties of other ingredients in the rubber composition.

Here then is a significant aspect of the invention, namely, the mixing of (i) such a coupled elastomer with (ii) modified carbon black which contains one or more of the aforesaid moieties on its surface such as, for example, silanol groups and (iii) a silica coupler.

Apparently the interaction between (i) the tin coupled or capped elastomer, for which it is believed that the tin takes an active part particularly when somewhat decoupled from at least a part of the elastomer, (ii) the silanol groups on the carbon blacks as well as (iii) a moiety such as an alkoxy silane moiety on the silica coupler act to create a rubber composition with enhanced physical properties, particularly when used for a tire tread composition.

In order to enhance such interaction, it is considered herein that a significant aspect of the invention is that the rubber composition is prepared by mixing the aforesaid ingredients in a series of sequential mixing steps in which at least one of the mixing steps prior to adding sulfur and vulcanization accelerators is conducted at an elevated temperature in a range of about 160° C. to about 175° C. or to 180° C. in order to encourage an apparent breaking of the tin bonds in the coupled copolymer and to reduce the reaction- or interaction time between the tin, silanol groups on the carbon black, alkoxy silane moiety on the silica coupler and the elastomer(s) itself (themselves).

In the practice of this invention, it has been observed that the addition of a surface-modified carbon black, especially the aforesaid silane-modified carbon black, together with the silica coupler, to the rubber composition results in not only improved processing characteristics for the carbon black reinforced elastomer composition such as, for example, reduced viscosity compared to full silica compound, but also in improved cured elastomer composition performance properties such as, for example, abrasion resistance and/or rebound values and Tan. Delta and loss compliance.

Cured physical properties such as abrasion resistance, and rebound values are considered herein to be beneficial because tire treads having such properties are anticipated herein to provide one or more of improved treadwear, rolling resistance and wet skid.

It is considered herein that this invention is a departure from prior practice, such as U.S. Pat. No. 4,820,751, because the surface-modified carbon black containing moieties such as silanols, siloxanes, acids, ketones and/or aldehydes, with the primary moieties under consideration herein for the purposes of this invention being the silanol moiety(ies), is used herein in combination with a silica coupler, which contains a silane moiety which can react with the aforesaid moiety(ies), such as silanol groups, on the treated carbon black surface, in a substantially carbon black reinforced (eg. at least 40 phr of carbon black and less than 15 phr of silica) rubber composition.

The term "silica coupler" is used herein to describe such materials because they are considered as being suitable for coupling silica to diene-based elastomers. However, the term "silica coupler" is also used herein to describe such materials for use in this invention whether or not silica is actually used in the rubber composition.

While in the practice of this invention various silica couplers can be used, one preferred coupler is a bis-(trialkoxysilylalkyl) polysulfide containing from about 2 to about 8 sulfur atoms in the polysulfide bridge, alternatively an average of about 4 sulfur atoms in the polysulfide bridge. For example, the silica coupler can be bis-(3-triethoxysilylpropyl) tetrasulfide having an average of about 4 sulfur atoms in its polysulfide bridge or, in an alternative, a polysulfide having about 2 sulfur atoms in its polysulfide bridge.

Conventionally a weight ratio of silica coupler to the said surface-modified carbon black, and precipitated silica, if used, is in a range of about 0.01/1 to about 0.25/1.

The rubber composition itself can also be provided as being a sulfur cured composition through vulcanization of the uncured elastomer composition. The sulfur curing is accomplished in a conventional manner, namely, by curing under conditions of elevated temperature and pressure for a suitable period of time.

The curatives for sulfur curing the rubber composition are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Sequential mixing processes for preparing sulfur curable rubber compositions in which elastomers and associated ingredients exclusive of curatives are first mixed in one or more sequential steps, usually called a "non-productive mixing step(s)" followed by a final mixing step for adding curatives, usually called a "productive mixing step", are also well known to those skilled in the art.

In the practice of this invention, as hereinbefore pointed out, the rubber composition may be comprised of at least one diene-based elastomer, or rubber in addition to the modified elastomer. Such elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alpha-methylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

In one aspect, particularly for a tire tread, the rubber might be of at least two of diene based rubbers, in addition to the modified elastomer. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, cis 1,4-polybutadiene rubbers and emulsion polymerization prepared butadiene/acrylonitrile copolymers.

The vulcanized rubber composition should contain a sufficient amount of the surface-treated carbon black reinforcing filler namely, greater than about 30, and usually greater than about 40 phr, to contribute a reasonably high modulus, high abrasion resistance and resistance to tear for the cured rubber composition. The amount of the surface-treated carbon black, as hereinbefore referenced, may be as low as about 30 parts per 100 parts rubber, but is preferably from about 40 to about 90 or even up to about 100 parts by weight.

Silica may be present in levels below about 100 phr such as, for example, about 10 to about 90 phr, or not at all.

The commonly employed siliceous pigments used in rubber compounding applications can be used as the silica in this invention, including pyrogenic and precipitated siliceous pigments, including aluminosilicates, although precipitated silicas are usually preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram ($m^2/g$). The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300 cc/100 gm.

The silica might be expected to have an average ultimate particle size, for example, in the range of 0.003 to 0.05 micron as determined by the electron microscope, although the silica particles may be even smaller, or possibly larger, in size.

The silica may also be expected to have mercury porosimetry characteristics such as, for example, HgSSA in a range of about 50 to about 200 $m^2/g$, a V(Hg) in a range of about 1 to about 3.5 $cm^3/g$ and a PSD max between 10 to about 50 nm.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, BV3380GR, etc. and from Huber as Zeopol 8745.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Low amounts of reinforcing type carbon blacks(s), for this invention other than the aforesaid surface treated carbon black, if used, are hereinbefore set forth.

It is to be appreciated that the silica coupler and/or the silica silylating agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed silylating agent in combination with a silica coupler in a silica reinforced rubber composition.

The presence and relative amounts of the other additives, as hereinbefore described, are not considered to be an aspect of the present invention which is more primarily directed to the utilization of the prescribed silylating agent(s).

The ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage (s). The rubber, silica, silica coupler, silica silylating agent, and carbon black if used, are mixed in one or more non-productive mix stages. The terms "non-productive" and "productive" mix stages are well known to those having skill in the rubber mixing art.

In at least one of the non-productive (NP) mixing stages, the materials are thermomechanically mixed and the mixing temperature is allowed to reach a temperature between 140° C. and 190° C.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Carbon black (N234) is modified by being surface treated with a silane by the following method:

An oven is purged with a nitrogen to create an inert gaseous atmosphere within the oven.

After gently crushing the carbon black, 0.5 grams of tetraethoxysilane per gram of carbon black are added to the carbon black. The homogenized mixture is then placed in a tempered alumina crucible. The crucible is placed in the oven. The oven is purged with nitrogen from about 30 minutes and then heated up to about 800° C. for about two hours. The crucible is then removed from the oven and the contents cooled to about room temperature which is typically in a range of about 22° C. to about 25° C.

The N234 carbon black is a rubber reinforcing type of carbon black obtained as Vulcan 7H from the Cabot company and the tetraethoxy silane was obtained as a liquid from the Aldrich company.

Properties of the carbon black before and after the surface treatment are reported herein in the following Table 1.

TABLE 1

| Property | Carbon Black Before Treatment | Carbon Black After Treatment |
| --- | --- | --- |
| Nitrogen No. (BET) | 153.9 | 135.7 |
| DBP Value | 127 | 125 |
| HgSSA (m$^2$/g) | 93.9 | 86.7 |
| V (Hg) (cm$^3$/g) | 1.44 | 1.38 |
| PSD maximum (nm) | 40 | 30–40 |
| Silanol Content (SiOH/nm$^2$) | 0 | 0.75 |
| Silicon Content | 0 | 1.5 |

The reduction in nitrogen absorption value (BET) for the treated carbon black surface indicates the surface modification due to the tetraalkoxy silane treatment.

The substantial equivalence of the DBP and V(Hg) values for the untreated and treated carbon black surface indicates the overall structure of the carbon black has not been affected.

The reduction in HgSSA for the treated carbon black surface indicates the coverage of the carbon black surface by the silicon-containing structure, including the silanol content.

The PSD maximum (this term stands for: "maximum pore size distribution") for the untreated and treated carbon black surface indicates a partial filling of the pores of the carbon black surface.

The silanol and siloxane contents on the surface of the treated carbon black surface indicates that the silane treatment of the carbon black was successful.

The silicon content of about 1.5 weight percent is based on the total of carbon and silicon as determined by ashing the carbon black at a temperature of about 700° C. in an oxidative atmosphere, namely, in air.

An evaluation of the degree of modification of the surface of the carbon black was based upon a determination of silanol (SiOH) content and the silicon content. The analytical tools used were FTIR spectroscopy which measures the silanol content, 29Si NMR (solid state) spectroscopy which measures the Si—OH and siloxane structures. All of these spectroscopy techniques are believed to be well known to those skilled in such analytical art.

EXAMPLE II

The surface treated carbon black prepared according to Example I was utilized for reinforcement of a rubber composition according to a recipe demonstrated in the following Table 2.

TABLE 2

| Material | Parts |
| --- | --- |
| Non-Productive Mix Stages | |
| E-SBR[1] | 25 |
| Isoprene/Butadiene[2] Rubber | 45 |
| BR[3] | 20 |
| Natural Rubber[4] | 10 |
| Processing Aids[5] | 23.4 |
| Fatty Acid | 3 |
| Silica[7] | Variable |
| Carbon Black, N234 | Variable |
| Coupling Agent[8] | Variable |
| Productive Mix Stage | |
| Sulfur | 1.5 |
| Zinc Oxide | 2.5 |
| Antioxidant(s)[6] | 3 |
| Sulfenamide and Thiuram Type Accelerators | 1.2 |

[1]Emulsion polymerization prepared SBR obtainable from The Goodyear Tire & Rubber Company having styrene content of about 40 percent.
[2]Isoprene/butadiene copolymer elastomer having a Tg of about −45° C. and an isoprene content of about 50 percent obtained from The Goodyear Tire & Rubber Company.
[3]Cis 1,4-polybutadiene rubber obtained as Budene ® 1207 from The Goodyear Tire & Rubber Company.
[4]Natural rubber (cis 1,4-polyisoprene).
[5]Rubber processing oil as being about 9.4 parts in the E-SBR, where the amount of E-SBR is reported above on a dry weight (without the oil) and in addition, about 14 parts additional rubber processing oil, plasticizers, resins and waxes were added.
[6]Of the di-aryl paraphenylene diamine and dihydro-trimethyl quinoline type.
[7]A silica obtained as Z1165 MP from the Rhone Poulenc company.
[8]Obtained as bis-3-(triethoxysilylpropyl) tetrasulfide (50% active) commercially available as X50S from Degussa as a 50/50 blend of the tetrasulfide with N330 carbon black (thus, considered 50% active).

The carbon black, silica and silica coupler components of the recipe shown in Table 2 are depicted in the following Table 3.

Experiment composition A is considered as being somewhat of a control since it uses the untreated carbon black and without any silica or silica coupler.

Experiment composition B uses the untreated carbon black with a silica coupler.

Experiment composition C uses the treated carbon black with a silica coupler.

Experiment composition D uses the silica and a silica coupler.

TABLE 3

| | Exp A | Exp B | Exp C | Exp D |
| --- | --- | --- | --- | --- |
| N234 CB[1] | 73 | 73 | 0 | 0 |
| Treated N234[2] | 0 | 0 | 73 | 0 |
| Silica Coupler[3] | 0 | 3 | 3 | 13.5 |
| Silica[4] | 0 | 0 | 0 | 83 |

[1]Untreated N234 rubber reinforcing carbon black obtained as Vulcan 7H from the Cabot Corporation.
[2]Treated carbon black as referenced in Example I.
[4]Blend of bis (3-triethoxy-silylpropoyl) tetrasulfide and carbon black in a 1:1 ratio and obtained as X50S from Degussa A.G.
[4]A silica obtained as Zeosil 1165 MP from the Rhone Poulenc company.

Physical properties of the rubber compositions for Exp. A, B, C and D are reported in the following Table 4.

TABLE 4

| Property | Exp A | Exp B | Exp C | Exp D |
| --- | --- | --- | --- | --- |
| A. Rheometer Data | | | | |
| Min Torque (Nm) | 11.8 | 12.5 | 13.6 | 12.1 |
| Max Torque (Nm) | 44.1 | 44.2 | 42.5 | 43.7 |
| $T_{90}$ (min) | 14.1 | 14.7 | 13.9 | 13.2 |
| B. Stress-Strain | | | | |
| Tensile (MPa) | 20.2 | 19.9 | 15.0 | 19.2 |
| 100% Modulus (MPa) | 3.0 | 3.1 | 3.2 | 2.2 |
| 300% Modulus (MPa) | 14.2 | 14.6 | 13.5 | 10.7 |
| C. Viscoelastic Properties | | | | |
| LC at −10° C. | 6.1 E-8 | 6.5 E-8 | 7.6 E-8 | 7.7 E-8 |
| Tan. Delta @ 50° C. | 0.33 | 0.32 | 0.24 | 0.24 |

In general, these results indicates that use of the silane treated carbon black as reinforcement in a tire tread rubber composition is predicted to cause, or promote, a reduction of a tire's rolling resistance substantially equivalent to using silica instead of the treated carbon black and an improved wet traction as compared to non-treated carbon black (Exp. A, B). This is considered herein to be important and significant because a comparable tire tread should be able to be prepared with a substantial reduction of silica, coupler and, also, to provide such a tire tread with a more desirable electrical conductivity as compared to a tire tread containing a substantial silica reinforcement content (at least about 50 phr and a minimal amount of carbon black (carbon black without the silane treatment of this invention) of less than about 40 phr.

The Rheometer property in Table 4, namely, the cured rubber property for the Experiments A to D, demonstrates that of the rubber compositions Experiments A to D were suitably vulcanized. This is considered herein to be an important condition to make reliable physical comparisons.

The stress-strain property in Table 4, particularly the tensile and 300% modulus properties for the Experiments A to D compositions, demonstrates the reinforcing properties of the materials. This is considered herein to be important because it shows e.g. the potential of the surface tread carbon black in a tire tread rubber composition as far as enhancing tire treadwear is concerned.

The Tan. Delta property in Table 4 for the Experiment C composition (surface treated carbon black plus silica coupler) is predictive that the surface treated carbon black is equivalent or even better for reinforcing a tire tread rubber composition than the silica for tire rolling resistance enhancement. It is also considered herein that the Experiment C composition using the silane treated carbon black is far better than the corresponding Experiment A composition using the non-treated carbon black without either of the silica or silica coupler for such purpose. This is considered herein to be important and particularly significant because, in one aspect, far less silica coupler can be used.

Static electrical surface conductive measurements were made on cured samples of Experiments A to D according to ASTM D257.

The results are shown in the following Table 5 in which the conductivity is expressed in units of ohms.

TABLE 5

|  | Exp A | Exp B | Exp C | Exp D |
|---|---|---|---|---|
| Conductivity (ohms) | $2.5 \times 10^{-3}$ | $3.1 \times 10^{-3}$ | $2.8 \times 10^{-3}$ | $5.1 \times 10^{-13}$ |

The conductivity measurements reported in Table 5 show a conductivity of $2.5 \times 10^{-3}$ ohms for the rubber composition containing only the normal carbon reinforcement (Exp A) and a very low conductivity of $5.1 \times 10^{-13}$ for the rubber composition containing silica with carbon black reinforcement (Exp D). Conductivities of $2.8 \times 10^{13}$, for the rubber compositions containing the treated carbon black of this invention (Exp C), compared very favorably with the conductivity for the rubber composition using only silica reinforcement (Exp D).

For the experimental aspect of this invention, an evaluation of the degree of modification of the surface of the carbon black was based upon a determination of silanol (SiOH) content. The analytical tools used were FTIR spectroscopy which measures the silanol and siloxane vibrations 29Si NMR (solid state) spectroscopy which measures the shift of silanol and siloxane absorbance and SIMS spectroscopy which measures the characteristic fragmentation of silanol and siloxane groups, all on the surface of the treated carbon black. All of these spectroscopy techniques are believed to be well known to those skilled in such analytical art.

For the FTIR spectroscopy, which was a preferable analytical tool, the following were used:

1) for the silanol groups, an absorbance at 3250 $cm^{-1}$ was used;
2) for the siloxane groups, an absorbance at 1150 $cm^{-1}$ was used;
3) a literature reference concerning the FTIR spectra may be an article by C. Eaborn entitled "Organosilicon Compounds" published by Butterworths Ltd, 1960; and
4) a literature reference concerning a technique in determining mercury (Hg) porosimetry may be a reference by Messrs S. J. Gregg and K. S. King entitled "Adsorption, Surface Area and Porosimetry", Academic Press, 1982, London/New York II Edition, ISBN 0-12-300956-1.

EXAMPLE III

Rubber compositions composed of a tin coupled solution polymerization prepared styrene/butadiene copolymer, silica coupler and surface treated carbon black containing silanol groups are prepared. The rubber compositions are referred to herein as Exp P, Exp Q, Exp R and Exp S.

The elastomers and most of the ingredients, except for the curatives as sulfur and accelerators, are mixed in an initial sequential series of two mixing steps, sometimes referred to those having skill in such are as "non-productive" or "NP" mixing steps. In at least one of the NP mixing steps, one of the coupled copolymer elastomers, carbon black with silanol groups on its surface and silica coupler are mixed to a temperature of about 170° C. before removing the mixture from the internal mixer.

Lastly, the curatives, such as sulfur and vulcanization accelerators, are mixed with the rubber mixture at a lower temperature, namely 120° C., as a last mixing step which is sometimes referred to by those having skill in such art as a "productive" mixing step.

The elements of the rubber composition are shown in the following Table 6.

TABLE 6

| Material | Parts |
|---|---|
| Non-Productive Mix Stages | |
| Sn-SSBR[1] | 100 |
| Processing Aids | 5 |
| Fatty Acid | 2.5 |
| Antioxidant(s)[2] | 2.8 |
| Carbon Black, Treated[3] | 47 |
| Coupling Agent[4] | 1.5 |
| Rubber processing oil, non-aromatic | 0 to 5 |
| Productive Mix Stage | |
| Sulfur | 1.5 |
| Zinc Oxide | 3.5 |
| Sulfenamide and Thiuram Type Accelerators | 1.9 |

[1]Tin coupled solution polymerization prepared styrene/butadiene copolymer may be obtained as T5582 from the JSR company having a styrene content of about 35 percent, Sn-butadienyl terminal units where, reportedly, the butadiene portion of the copolymer has about a 22% vinyl structure, a Mooney ML1+4(100) viscosity of about 77 and bimodal molecular weight distribution, and with a Tg of about -51° C.
[2]Of the di-aryl paraphenylene diamine and dihydro-trimethyl quinoline type.
[3]A treated carbon black, as described in Example I herein, having a silanol content on its surface of about 0.75 $SiOH/nm^2$ and a silicon content of about 1.5 weight percent.
[4]Obtainable as bis-3-(triethoxysilylpropyl) tetrasulfide (50% active) commercially available as X50S from Degussa as a 50/50 blend of the tetrasulfide with N330 carbon black (thus, considered 50% active).

EXAMPLE IV

The rubber compositions identified herein as the Exp P, Exp Q, Exp R and Exp S of Example III, with the variations of tin coupled SBR, carbon black which contains silanol groups, silica and silica coupler, are shown in the following Table 7.

TABLE 7

|  | Exp P | Exp Q | Exp R | Exp S |
|---|---|---|---|---|
| Sn-SSBR[1] | 100 | 100 | 100 | 0 |
| Treated Carbon Black[2] | 47 | 40 | 0 | 0 |
| Silica Coupler[3] | 1.5 | 1.5 | 1.5 | 13.5 |
| Silica[4] | 0 | 0 | 0 | 49 |
| Non-Treated Carbon Black (N234) | 0 | 0 | 47 | 4 |

[1]Tin coupled solution polymerization prepared styrene/butadiene copolymer obtainable as T5582 from the JSR company having a styrene content of about 35 percent, Sn-butadienyl terminal units where, reportedly, the butadiene portion of the copolymer has about a 22% vinyl structure, a Mooney ML1+4(100) viscosity of about 77 and bimodal molecular weight distribution and having a Tg of about -51° C.
[2]A treated carbon black as described in Example I herein, having a silanol content on its surface of about 0.75 $SiOH/nm^2$ and a silicon content of about 1.5 weight percent.
[3]Blend of bis (3-triethoxy-silylpropyl) tetrasulfide and carbon black in a 1:1 ratio and obtainable as X50S from Degussa A.G.
[4]A silica obtainable as Zeosil 1165 MP from the Rhone Poulenc company.

Significantly, a substantial reduction of silica is used with an expected improvement of electrical conductivity.

EXAMPLE V

Tires of size 195/65R15 are prepared having treads, individually, of rubber compositions Exp P and Exp Q shown in Example III and Example IV.

While certain representative embodiments and details have been shown for the purpose of illustrating the invention, it will be apparent to those skilled in this art that various changes and modifications may be made therein without departing from the spirit or scope of the invention.

What is claimed is:

1. A tire having a tread of a rubber composition comprised of (A) 100 parts by weight of at least one diene-based elastomer composed of (i) about 50 to about 80 phr of at least one modified copolymer elastomer of styrene or alpha-methylstyrene and conjugated diene selected from at least one of butadiene and isoprene, said modified elastomer being a coupled or capped elastomer with tin or silicon and (ii) 20 to about 50 phr of at least one elastomer selected from homopolymers of conjugated dienes selected from butadiene and isoprene, copolymers of said conjugated dienes, copolymers of said conjugated diene(s) with an aromatic hydrocarbon selected from styrene and alpha-methylstyrene, (B) about 30 to about 110 phr of reinforcing filler composed of (i) about 30 to about 110 phr of modified reinforcing carbon black, said carbon black containing at least one moiety selected from silanol, siloxane, titanium oxide, titanium hydroxide, zirconium oxide, zirconium hydroxide and aluminum hydroxide groups on the surface thereof, and (ii) zero to about 30 phr of at least one of (a) precipitated silica containing silanol groups on the surface thereof and (b) unmodified reinforcing carbon black, (C) at least one silica coupler having a moiety reactive with (i) at least one of said moiety(ies) contained on the surface of said surface-modified carbon black and (ii) with silanol groups on said silica, if silica is used, and another moiety interactive with at least one of said elastomer(s).

2. The tire of claim 1 wherein said modified carbon black is a surface-modified carbon black characterized by containing about 0.5 to about 20 weight percent of silicon, titanium, zirconium and/or aluminum on the surface thereof as determined by ashing the modified carbon black in an oxidative atmosphere.

3. The tire of claim 1 wherein the surface of the modified carbon black contains silanol and siloxane groups thereon to the exclusion of titanium, zirconium and aluminum based moieties.

4. The tire of claim 3 wherein the modified carbon black contains about 0.1 to about 8 silanol groups per $nm^2$ of the surface of said carbon black.

5. A tire of claim 1 wherein the modified carbon black surface contains titanium hydroxide groups thereon to the exclusion of silicon, zirconium and aluminum moieties.

6. A tire of claim 1 wherein the modified carbon black surface contains zirconium hydroxide groups thereon to the exclusion of silicon, titanium and aluminum moieties.

7. A tire of claim 1 wherein the modified carbon black surface contains aluminum hydroxide groups thereon to the exclusion of silicon, titanium and zirconium moieties.

8. A tire of claim 1 wherein the modified carbon black surface contains silanol and zirconium hydroxide groups thereon to the exclusion of titanium and aluminum moieties.

9. A tire of claim 1 wherein the modified carbon black surface contains silanol and titanium hydroxide groups thereon to the exclusion of zirconium and aluminum moieties.

10. A tire of claim 1 wherein the modified carbon black surface contains titanium hydroxide groups and zirconium hydroxide groups thereon to the exclusion of silicon and aluminum moieties.

11. A tire of claim 1 wherein the modified carbon black surface contains silanol and aluminum hydroxide groups thereon to the exclusion of silicon, titanium and zirconium moieties.

12. The tire of claim 1 wherein the surface of said modified carbon black is the product of reacting carbon black with at least one alkoxy compound selected from $R_{4-n}M(OR')_n$, wherein R is a saturated alkyl radical selected from methyl, ethyl, propyl, and butyl radicals; R' is a saturated alkyl radical containing from 1 to 18 carbon atoms; and M is selected from silicon, titanium, zirconium and aluminum and wherein n is an integer from 1 to and including 4 and, where M is aluminum, the formula is $R_{3-n}M(OR')_n$ where n is from 1 to and including 3.

13. The tire of claim 12 wherein n is 4, M is silicon and R' is selected from methyl, ethyl and propyl radicals.

14. The tire of claim 12 wherein n is 4, M is titanium and R' is selected from methyl, ethyl and propyl radicals.

15. The tire of claim 12 wherein n is 4, M is zirconium and R' is selected from methyl, ethyl and propyl radicals.

16. The tire of claim 12 wherein n is 3, M is silicon, R is selected from methyl, ethyl and propyl radicals and R' is selected from methyl, ethyl and propyl radicals.

17. The tire of claim 12 wherein n is 3, M is titanium, R is selected from methyl, ethyl and propyl radicals and R' is selected from methyl, ethyl and propyl radicals.

18. The tire of claim 12 wherein n is 3, M is zirconium, R is selected from methyl, ethyl and propyl radicals and R' is selected from methyl, ethyl and propyl radicals.

19. The tire of claim 12 wherein n is 3, M is aluminum, R is selected from methyl, ethyl and propyl radicals and R' is selected from methyl, ethyl and propyl radicals.

20. The tire of claim 12 wherein n is 2, M is silicon, R is selected from methyl, ethyl and propyl radicals and R' is selected from methyl, ethyl and propyl radicals.

21. The tire of claim 12 wherein n is 2, M is titanium, R is selected from methyl, ethyl and propyl radicals and R' is selected from methyl, ethyl and propyl radicals.

22. The tire of claim 12 wherein n is 2, M is zirconium, R is selected from methyl, ethyl and propyl radicals and R' is selected from methyl, ethyl and propyl radicals.

23. The tire of claim 12 wherein n is 2, M is aluminum, R is selected from methyl, ethyl and propyl radicals and R' is selected from methyl, ethyl and propyl radicals.

24. The tire of claim 12 wherein n is 1, M is silicon, R is selected from methyl, ethyl and propyl radicals and R' is selected from methyl, ethyl and propyl radicals.

25. The tire of claim 12 wherein n is 1, M is titanium, R is selected from methyl, ethyl and propyl radicals and R' is selected from methyl, ethyl and propyl radicals.

26. The tire of claim 12 wherein n is 1, M is zirconium, R is selected from methyl, ethyl and propyl radicals and R' is selected from methyl, ethyl and propyl radicals.

27. The tire of claim 12 wherein n is 1, M is aluminum, R is selected from methyl, ethyl and propyl radicals and R' is selected from methyl, ethyl and propyl radicals.

28. The tire of claim 1 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

29. The tire of claim 28 wherein n is 4, M' is tin and X' is chlorine.

30. The tire of claim 28 wherein n is 4, M' is silicon and X' is chlorine.

31. The tire of claim 28 wherein n is 3, M' is tin, X' is chlorine and R" is selected from methyl, ethyl and propyl radicals.

32. The tire of claim 28 wherein n is 3, M' is silicon, X' is chlorine and R" is selected from methyl, ethyl and propyl radicals.

33. The tire of claim 28 wherein n is 2, M' is tin, X' is chlorine and R" is selected from methyl, ethyl and propyl radicals.

34. The tire of claim 28 wherein n is 2, M' is silicon, X' is chlorine and R" is selected from methyl, ethyl and propyl radicals.

35. The tire of claim 28 wherein n is 1, M' is tin, X' is chlorine and R" is selected from methyl, ethyl and propyl radicals.

36. The tire of claim 28 wherein n is 1, M' is silicon, X' is chlorine and R" is selected from methyl, ethyl and propyl radicals.

37. The tire of claim 2 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

38. The tire of claim 3 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

39. The tire of claim 4 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

40. The tire of claim 5 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

41. The tire of claim 6 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

42. The tire of claim 7 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

43. The tire of claim 8 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

44. The tire of claim 9 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

45. The tire of claim 10 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

46. The tire of claim 11 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

47. The tire of claim 12 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

48. The tire of claim 13 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

49. The tire of claim 14 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

50. The tire of claim 15 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

51. The tire of claim 16 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

52. The tire of claim 17 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

53. The tire of claim 18 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

54. The tire of claim 19 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

55. The tire of claim 20 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

56. The tire of claim 21 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

57. The tire of claim 22 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

58. The tire of claim 23 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

59. The tire of claim 24 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

60. The tire of claim 25 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

61. The tire of claim 26 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

62. The tire of claim 27 wherein said modified styrene/conjugated diene copolymer is the product of modification of a reactive styrene/conjugated diene copolymer prepared by polymerization of styrene and conjugated diene selected from isoprene and 1,3-butadiene in the presence of an organolithium catalyst by reacting the live copolymer with at least one compound having the formula $R''_{4-n}M'X'_n$, wherein n is an integer from 1 to and including 4, X' is a halogen radical selected from chlorine, iodine and bromine radicals; R" is a saturated alkyl radical selected from methyl, ethyl, propyl and butyl radicals; and M' is selected from tin and silicon; wherein at least 50 percent of the Sn bonds, or Si bonds as the case may be, in the modified elastomer, are bonded to diene units of the styrene/diene copolymer.

63. The tire of claim 1 wherein said modified copolymer is a styrene/conjugated diene copolymer coupled with tin; wherein at least 50 percent of the Sn bonds in the modified elastomer are bonded to diene units of the styrene/diene copolymer.

64. The tire of claim 2 wherein said modified copolymer is a styrene/conjugated diene copolymer coupled with tin; wherein at least 50 percent of the Sn bonds in the modified elastomer are bonded to diene units of the styrene/diene copolymer.

65. The tire of claim 3 wherein said modified copolymer is a styrene/conjugated diene copolymer coupled with tin; wherein at least 50 percent of the Sn bonds in the modified elastomer are bonded to diene units of the styrene/diene copolymer.

66. The tire of claim 4 wherein said modified copolymer is a styrene/conjugated diene copolymer coupled with tin; wherein at least 50 percent of the Sn bonds in the modified elastomer are bonded to diene units of the styrene/diene copolymer.

67. The tire of claim 1 comprised of (A) 100 parts by weight of at least one diene-based elastomer composed of (i) about 20 to about 50 phr of at least one modified copolymer elastomer of styrene or alpha-methylstyrene and conjugated diene selected from at least one of butadiene and isoprene, said modified elastomer being a coupled or capped elastomer with tin or silicon and (ii) about 20 to about 50 phr of at least one elastomer selected from homopolymers of conjugated dienes selected from butadiene and isoprene, copolymers of said conjugated dienes, copolymers of said conjugated diene(s) with an aromatic hydrocarbon selected from styrene and alpha-methylstyrene, (B) about 30 to about 110 phr of reinforcing filler composed of (i) about 30 to about 90 phr of surface-modified reinforcing carbon black, said carbon black containing at least one moiety selected from silanol, siloxane, titanium oxide, titanium hydroxide, zirconium oxide, zirconium hydroxide and aluminum hydroxide groups on the surface thereof, and (ii) additional filler has about 10 to about 20 phr of at least one of precipitated silica containing silanol groups on the surface thereof and unmodified reinforcing carbon black, (C) at least one silica coupler having a moiety reactive with (i) at least one of said moiety(ies) contained on the surface of said surface-modified carbon black and (ii) with silanol groups on said silica, if silica is used, and another moiety interactive with at least one of said elastomer(s): and wherein about 60 to about 85 percent of the tin bonds in the modified copolymer elastomer are bonded to diene units of the styrene/diene copolymer.

68. The tire of claim 67 wherein said modified copolymer elastomer is a styrene/conjugated diene coupled with tin, having a styrene content within a range of about 10 to about 40 and a Tg within a range of about −85° C. to about 0° C.; and wherein said modified carbon black contains silanol groups on its surface in an amount of about 0.1 to about 8 silanol groups per $nm^2$ of the surface of said carbon black.

69. The tire of claim 67 wherein said modified copolymer elastomer is a styrene/conjugated diene capped with tin, having a styrene content within a range of about 10 to about 40 and a Tg within a range of about −85° C. to about 0° C. and wherein said modified carbon black contains silanol groups on its surface in an amount of about 0.1 to about 8 silanol groups per $nm^2$ of the surface of said carbon black.

* * * * *